(12) United States Patent
Felsing et al.

(10) Patent No.: US 10,713,150 B1
(45) Date of Patent: Jul. 14, 2020

(54) ACCURATE TEST COVERAGE OF GENERATED CODE

(71) Applicant: SAP SE, Walldorf (DE)

(72) Inventors: Dennis Felsing, Leimen (DE); Arnaud Lacurie, Mannheim (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/375,272

(22) Filed: Apr. 4, 2019

(51) Int. Cl.
*G06F 11/36* (2006.01)
*G06F 8/41* (2018.01)
*G06F 8/30* (2018.01)

(52) U.S. Cl.
CPC ............ *G06F 11/3676* (2013.01); *G06F 8/30* (2013.01); *G06F 8/41* (2013.01); *G06F 11/3688* (2013.01)

(58) Field of Classification Search
CPC .... G06F 11/3676; G06F 11/3668; G06F 8/30; G06F 8/41
USPC .................................................. 717/100–154
See application file for complete search history.

(56) References Cited

U.S. PATENT DOCUMENTS

| | | | | |
|---|---|---|---|---|
| 4,819,233 A * | 4/1989 | Delucia | ............... | G06F 11/3688 714/E11.209 |
| 5,651,111 A * | 7/1997 | McKeeman | ........ | G06F 11/3688 714/38.1 |
| 6,684,391 B1 * | 1/2004 | Stroetmann | ......... | G06F 9/44589 714/E11.209 |
| 7,587,636 B2 * | 9/2009 | Tillmann | ............ | G06F 11/3684 714/33 |
| 8,954,930 B2 * | 2/2015 | Kamenz | ................ | G06F 11/368 714/38.1 |
| 9,009,682 B2 * | 4/2015 | Tsantilis | .............. | G06F 11/3688 717/124 |
| 9,626,276 B2 * | 4/2017 | Schwarzmann | ..... | G06F 11/3612 |
| 9,792,203 B2 * | 10/2017 | Tenev | ................. | G06F 11/3684 |
| 2004/0015910 A1 * | 1/2004 | Tonouchi | ................ | G06F 8/427 717/143 |
| 2008/0235661 A1 * | 9/2008 | Arpana | ..................... | G06F 8/24 717/116 |
| 2012/0233597 A1 * | 9/2012 | Ogasawara | ............... | G06F 8/36 717/124 |

* cited by examiner

*Primary Examiner* — Marina Lee
(74) *Attorney, Agent, or Firm* — Mintz Levin Cohn Ferris Glovsky and Popeo, P.C.

(57) ABSTRACT

A method for measuring code coverage of runtime generated code is provided that can be used for unit testing. In some implementations, the method may include performing unit testing of one or more lines of code of an application by at least: executing during runtime the one or more lines of code, generating, from the executed one or more lines of code, additional code including generated code including instructions to increment at least one counter in a map, the map mapping one or more frames to the at least one counter, compiling the generated code, incrementing, each time the compiled generated code is executed during runtime, the at least one counter in the map, and providing the at least one counter to enable verification of the unit testing of the generated code. Related methods and articles of manufacture are also described.

20 Claims, 9 Drawing Sheets

ACCURATE TEST COVERAGE OF GENERATED CODE

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance. Accordingly, code associated with the development of database management systems have become increasingly complex to develop and test.

SUMMARY

In one aspect, a method, system, and articles of manufacture, including a computer program product, are provided. A method for measuring code coverage of runtime generated code is provided that can be used for unit testing. In some implementations, the method may include performing unit testing of one or more lines of code of an application by at least: executing during runtime the one or more lines of code, generating, from the executed one or more lines of code, additional code including generated code including instructions to increment at least one counter in a map, the map mapping one or more frames to the at least one counter, compiling the generated code, incrementing, each time the compiled generated code is executed during runtime, the at least one counter in the map, and providing the at least one counter to enable verification of the unit testing of the generated code.

In some variations, one or more features disclosed herein including the following features may optionally be included in any feasible combination. The generating may further include inserting, into the generated code, instructions for the at least one counter and compiling the generated code and the at least one counter. From the one or more lines of code, a stack trace of calls leading to the generated code may generated. The map may include a counter value for each of the calls in the stack trace. Each time the compiled generated code is executed during runtime, the corresponding counters for each of the calls in the stack trace is incremented. From the one or more lines of code, a plurality of stack traces of calls leading to the generated code may be determined, wherein for each of the plural of stack traces, the map includes a counter value for each of the calls in the stack trace. The one or more lines of code may be in accordance with a first language, and wherein the generated code may be in accordance with a second language. The first language may be C++, and the second language may be L.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
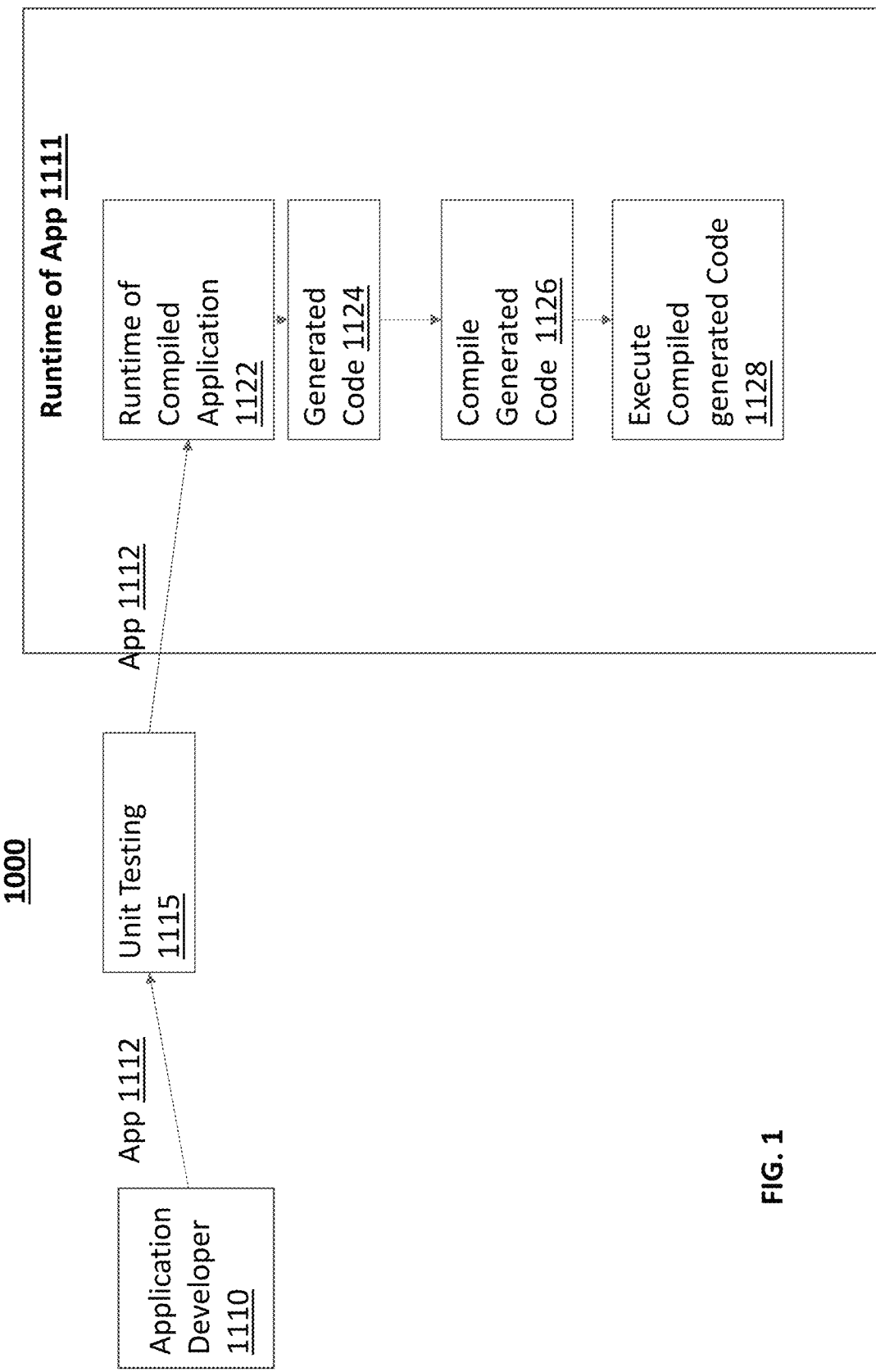
FIG. 1 depicts an example of a system for providing unit testing.

FIG. 1 depicts an example of a system 1000 for providing unit testing. In the example of FIG. 1, an application developer may develop an application 1112, which may be provided to unit testing 1115. Unit testing of the lines of code of the application 1112 may verify that each line of code has been covered by unit test. Often, the application 1112 may not pass unit testing and be released (or approved as being covered by unit testing) until unit testing verifies that each line of code, such as C++ code of application 1112, executes properly and thus covered by unit testing. Although this sounds like a relatively simple task, there are implementations in which the compiled application is tested and considered released or approved. However, this compiled application, when executed during runtime at 1111 for example, generates additional code, such as generated code, and this generated code is then compiled and executed. In this example, the initial unit testing (before the release or approval) may not have covered the additional lines of code generated during runtime. As such, this example illustrates a problem with unit testing that it may not cover each line of code being released or approved as being unit tested.

To illustrate further, the application 1112 may be for example a C++ application, which may be unit tested, compiled, and then released to an end-user. However, during runtime 1111 of the compiled C++ application 1112, the runtime may generate additional code, such as so-called "generated code." This generated code 1124 may be, for example, L language code (although the generated code may take other forms). At the runtime, the generated code may then be compiled 1126 and then executed at 1128. Although the underlying C++ code has been tested line by line as noted above, the generated code in this example has not.

Figure 2:
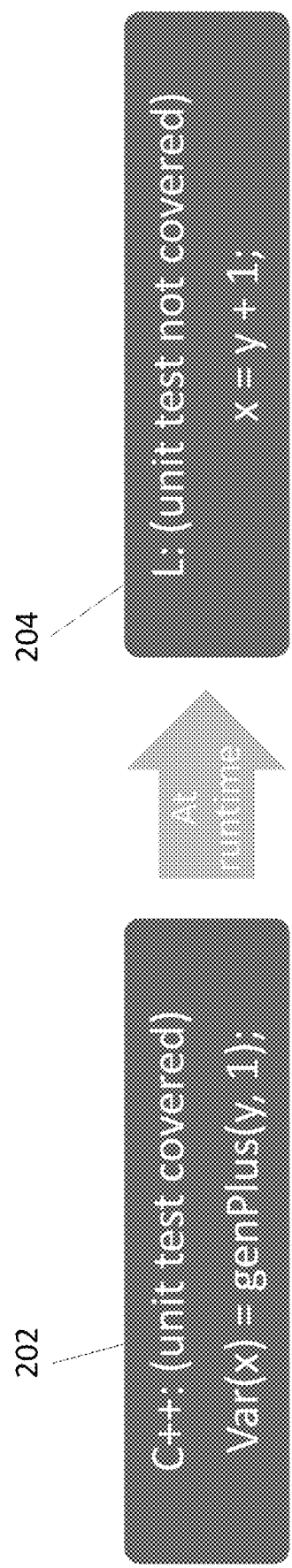
FIG. 2 depicts an example of code that happening during runtime generation of generated code.

FIG. 2 depicts an example of C++ code 202 (e.g., "Var (x)=genPlus(Y, 1)" for application 1112 that has undergone unit testing 1115 as indicated by "covered." As noted, this code 202 will, at runtime, generate code 204 (e.g., "x−y+1"). Although the code 202 is covered by unit testing, the generated code 204 (which in this example is "x−y+1") may not undergo unit testing and, as such, not covered by unit testing.

Figure 3:
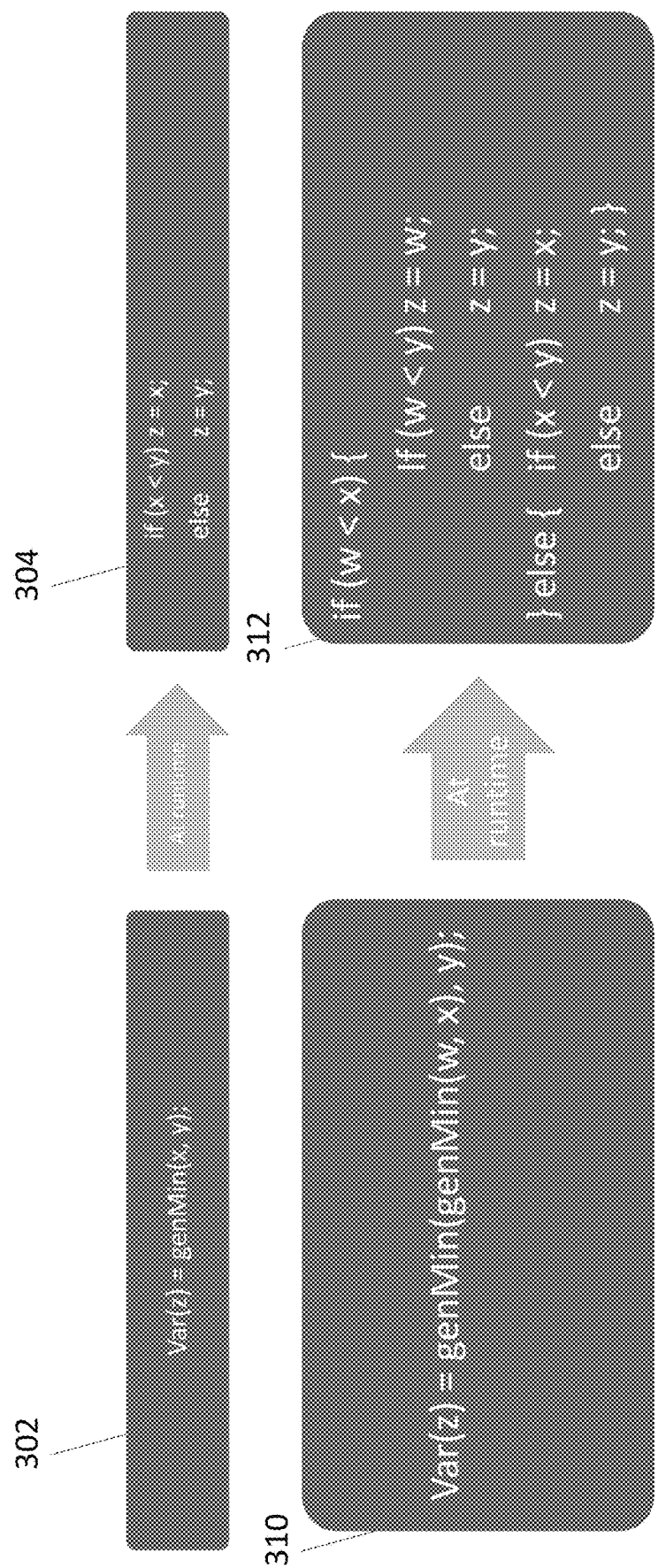
FIG. 3 depicts an additional example of code that happening during runtime generation of generated code.

FIG. 3 depicts an additional example of C++ code 302 (e.g., Var (z)=genMin(x, y)) and the runtime generated code 304 (if (x<y) z=x; else z=y;). Like the FIG. 2 example, the code 302 may be undergo unit testing 1115, but the generated code 304 (which is generated by code 302) does not undergo unit testing. FIG. 3 shows an additional example of the C++ code 310 (e.g., "Var(z)=genMin(genMin(w, x), y)") for application 1112 and the corresponding runtime generated code 312, which as noted may not undergo unit testing 1115.

FIGS. 2 and 3 show the issues with testing the lines of code related to application 1112. Moreover, the second example 310/312 shows the complexity of testing generated code as the C++ call stacks at execution may become complex.

In some embodiments, there is provided unit testing that includes a runtime framework that tracks testing of the runtime generated code. In some embodiments, there is provided a map that is used to track the runtime execution of the generated code.

Before providing additional description regarding the unit testing including the runtime framework that tracks testing of the runtime generated code, the following provides a description of the system.

Figure 4:
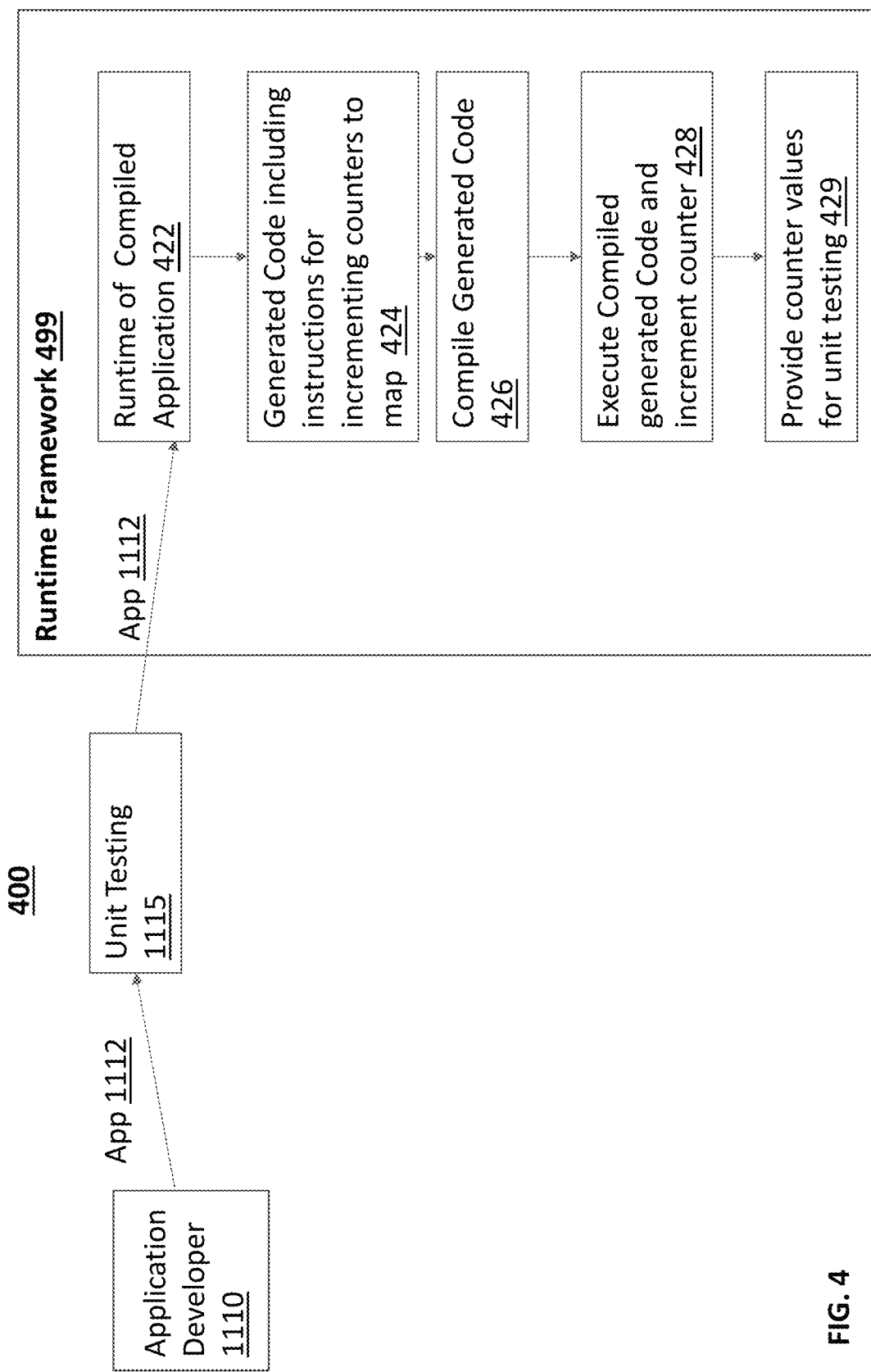
FIG. 4 depicts an example of a system for unit testing generated code.

FIG. 4 depicts an example of a system 400 for testing generated code, in accordance with some embodiments.

In the example of FIG. 4, the application 1112 may undergo unit testing 1115 to verify the operation of the lines of code of the application. In the example of FIG. 4, the unit testing 1115 includes a runtime framework 499 where the generated code is also tested.

For example, the C++ lines of code may, during runtime 422, generate additional code, such as generated code 204, 304, 312, and the like. As noted, this generated code may take the form of L language code, although other languages or types of code may be used as well.

In some embodiments, the runtime 422 of the application 1112 generates at 424 additional code, such as generated code and counters mapped to frames of a call stack, such as C++ trace of calls. The counters increment during the runtime execution of the generated code in order to track whether unit testing covered the corresponding call stack. Referring to FIG. 2 for example, the C++ code 202 of application 1112 when compiled and executed during runtime may generate (1) "generated code" 204 and (2) a counter that tracks the execution of the generated code 204 when later compiled and executed. In some implementations, during C++ runtime the code generates a global map and "generated code" containing instrumentation to increment the relevant counters inside the map.

In some instances, there may be a series of calls one of which is a call to the C++ code 202 that caused generated code 204. In other words, the sequence of calls to code 202 may vary, and this variation may also be tracked as part of unit testing. As such, for a given C++ call stack of the application 1112, each of the counters map to a unique entry for each frame of the call stack trace. Alternatively, the mapping may be from a frame of the call stack trace to the counters to enable rapid look up of each frame in the map.

And, the counter can be incremented during the runtime execution of the L language code 204. Next, the generated code including the instruction to increment the counters may be compiled at 424 and then executed at 428. Each time a call stack associated with the counter is executed, the counter is incremented. The map may be created in the C++ code, and then use pointers into the counters to increment them from the execution of the generated code. The counter values for the call stack may then be provided (e.g., accessed, read, sent, etc.) to the unit testing 1115 to confirm whether the generated code has been executed successfully without error.

Although some of the examples refer to specific languages such as C++ and L, these are used as illustrative examples as other languages may be used as well.

Figure 5:
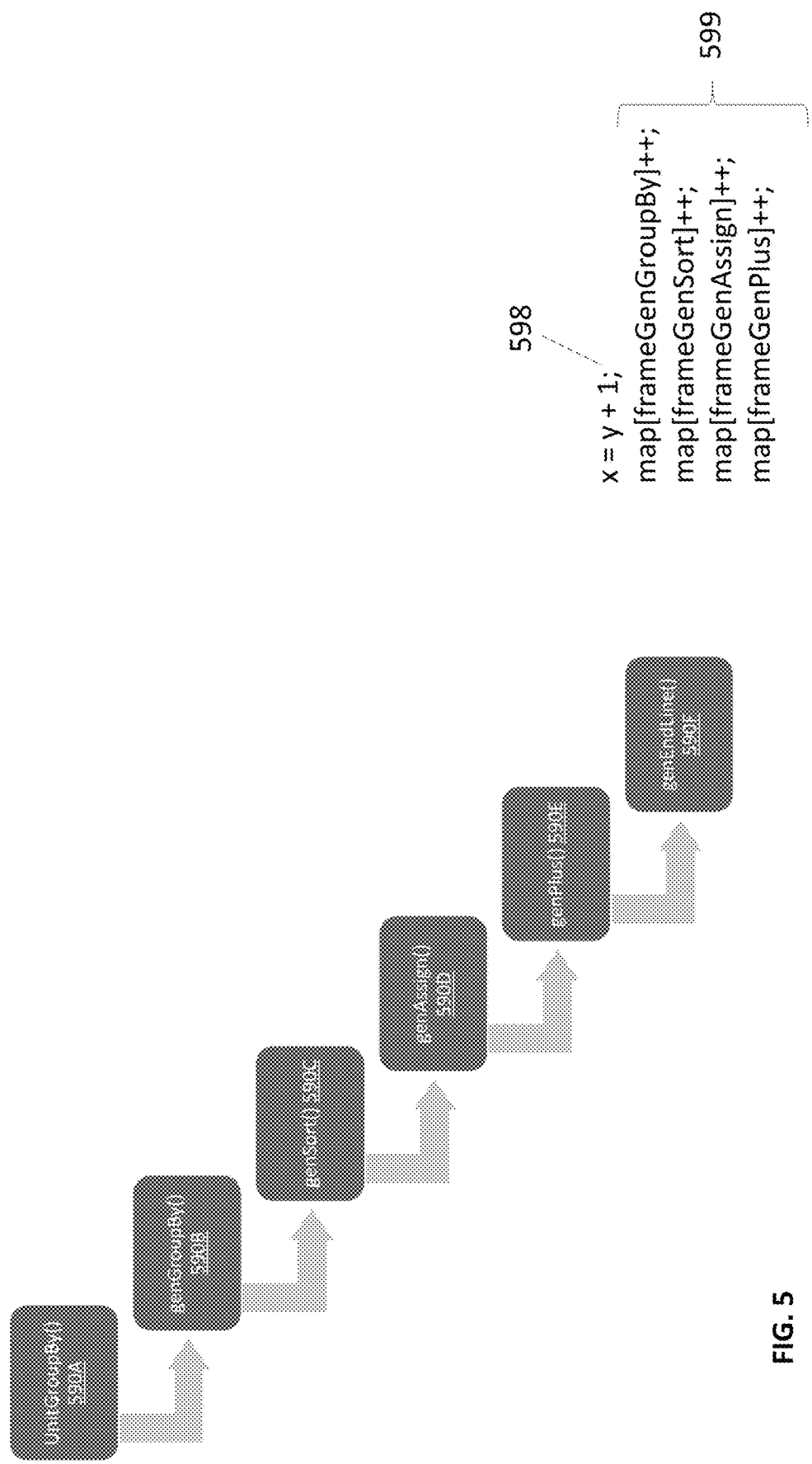
FIG. 5 depicts an example of a call sequence.

FIG. 5 depicts an example of a C++ call sequence 590A-590F. In this call stack, the first frame 590A represents a call from unit testing 1115, which calls the second frame 590B, which calls the third frame 590C, and so forth. In this sequence, the C++ code 202 is represented by the fifth frame 590D, which in this example is "Var(x)=genPlus(y, 1) "causing generated code g "x=y+1" 598 as in the FIG. 2 example. The code generation at 424 includes the generated code (e.g., the L language "x=y+1" 598) and instructions to increment the counters (as indicated by the "++" 599 that map to the frames of the call stack for tracking the runtime execution of the generated code 598 during a subsequent compilation and runtime. In this example, the counters 599 include the trace (e.g., path) indicating the C++ call stack. In this way, different traces can be tracked and verified as part of unit testing. In some embodiments, a global map is kept listing the call stacks and/or frames for the C++ code being tested during unit testing. This global map links to the counters, so that during runtime execution the counter is incremented resulting in the map's counter to increase by one.

Table 1 below depicts an example of the instructions inserted into the generated code to increment a counter in the map. After the L language code "x=y+1" 598 is compiled at 426 and then executed at 498 using the indicated call stack 590A-F, the counters (as indicated by the ++) are incremented as part of the runtime. At 424 for example, the generated code (which includes one or more counters) may be generated. In some implementations, there is a global map in C++ code, and this map may be extended with the corresponding frames of the C++ call stack trace every time L code is generated. The generated code is instrumented with increment operations accessing the corresponding counters in the global map and then compiled and/or interpreted.

At 426, the generated code including the counters are compiled and executed as part of runtime at 428. Each time the call stack of Table 1 is executed, a counter is incremented, and the counter values can be provided at 429 to (e.g., linked to) the map to enable for unit testing 1115. If the counters are zero after runtime, the call stack did not execute or did not execute successfully, so it is not covered by unit testing. However, if the counters have a value of 1 or more, then the call stack did execute or execute successfully, so the corresponding code is "covered" by unit testing. The success for the call stack and generated code "x=y+1" 598 (see, also, 204) can be associated with the initial C++ code, such as C++ code 202 (e.g., "Var(x)=genPlus(Y,1). In this way, the initial C++ lines of code and the generated code testing can be tracked as part of unit testing using a map function including counters.

TABLE 1 map[frameGenGroupBy]++;
map[frameGenSort]++;
map[frameGenAssign]++;
map[frameGenPlus]++

Figure 6:
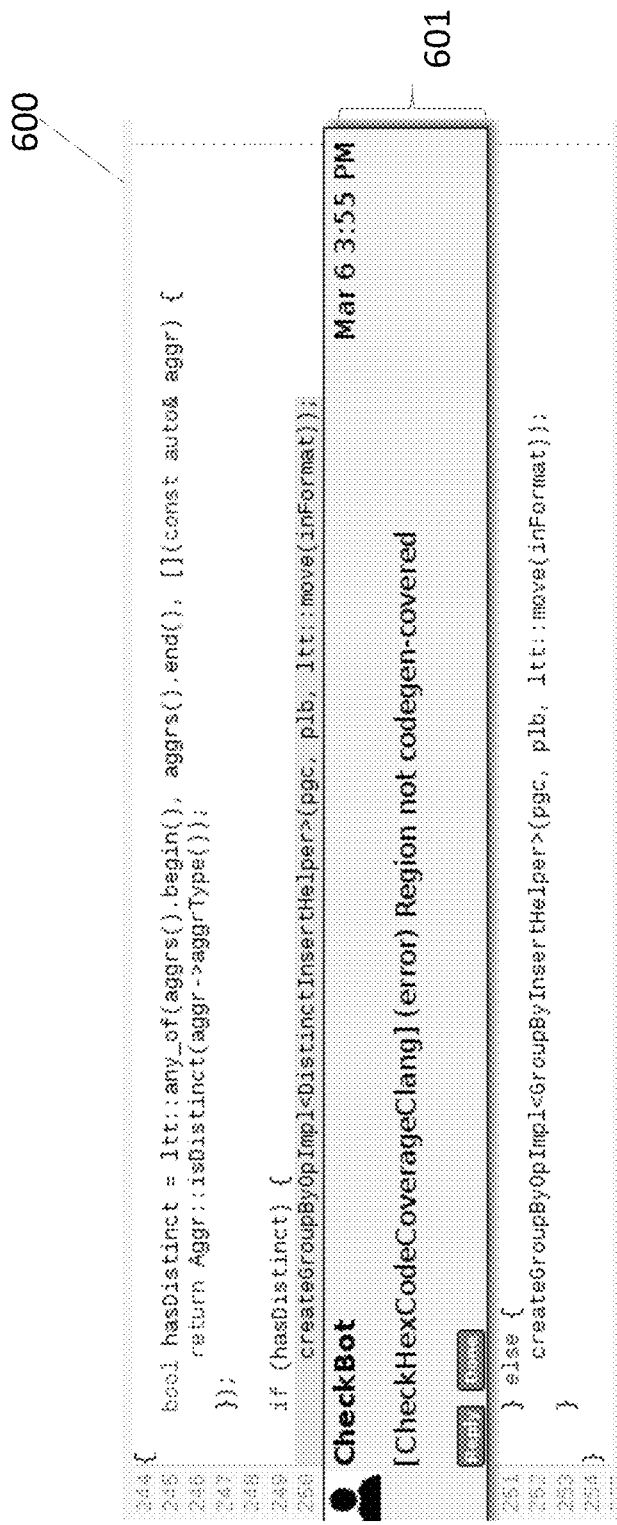
FIG. 6 depicts an example of a user interface associated with unit testing.

FIG. 6 depicts an example of a user interface 600 associated with unit testing 1115. In the example of FIG. 6, each line of the C++ code is verified as part of unit testing. And, if there is any additional generated code, such as the L language code (which is not shown) generated and executed during runtime 428, the runtime testing 1115 checks the map including counters of the corresponding L language code to check whether they have been executed (and whether any error exceptions were thrown during execution). In the example of FIG. 6, the unit testing 1115 includes a check bot (e.g., an automated or autonomous program) that checks whether each line of code for application 1112 has been tested. Here, line 250 includes C++ code that generates generated code, but the check bot flags at 601 that the generated code has not been covered by unit testing.

Figure 7:
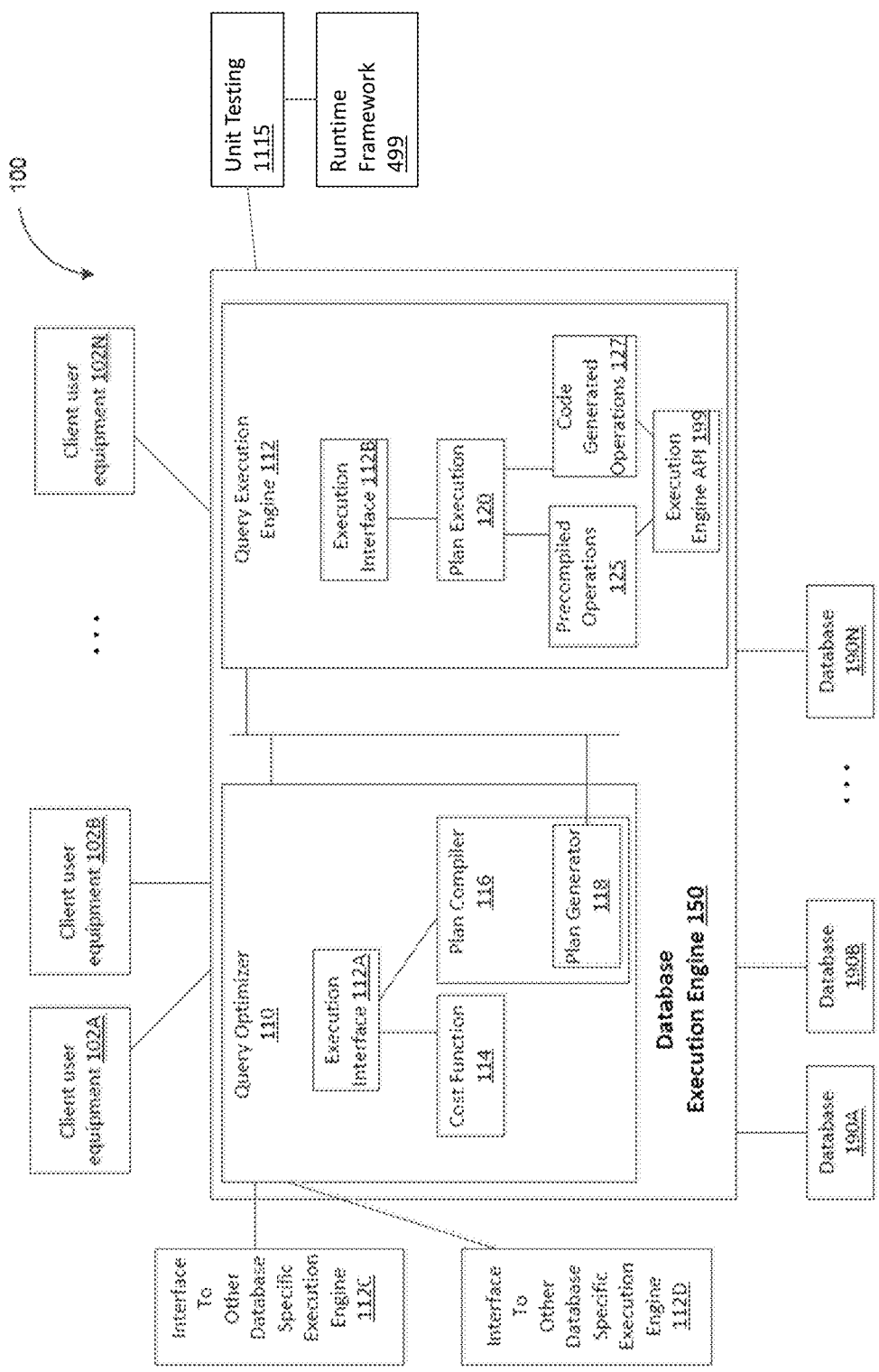
FIG. 7 depicts an example of a system including a database execution engine.

FIG. 7 depicts an example of a system 100 including a database execution engine 150, in accordance with some example implementations. The system 100 may include the unit testing 1115 and runtime framework 499 to unit test an application's 1112 code, such as the C++ code 202, 302, and 310, and the corresponding generated code 204, 304, and 312 (code such as L language code which is generated by the C++ code during runtime).

The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 7, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra." For example, SELECT Columns from Table A and columns from Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimized query plan, which may represent query algebra or relational algebra, as noted above. To compile a query plan, the query optimizer 110 may provide the query plan to the query plan compiler 116 to enable compilation of some, if not all, of the code (e.g., for a query plan into machine code. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated ("code-generated") specifically for execution of the query plan. For example, the query plan compiler 116 may select pre-compiled code for a given operation as part of the optimization of the query plan, while for another operation in the query plan the plan compiler 116 may allow a compiler to generate, compile, and execute the code during runtime. The pre-compiled and generated code represent code for executing (at the query execution engine layer 112 and/or database layer 190A etc.) the query plan, and this code may be provided to the plan generator 118, which interfaces the query execution engine 112.

Figure 9:
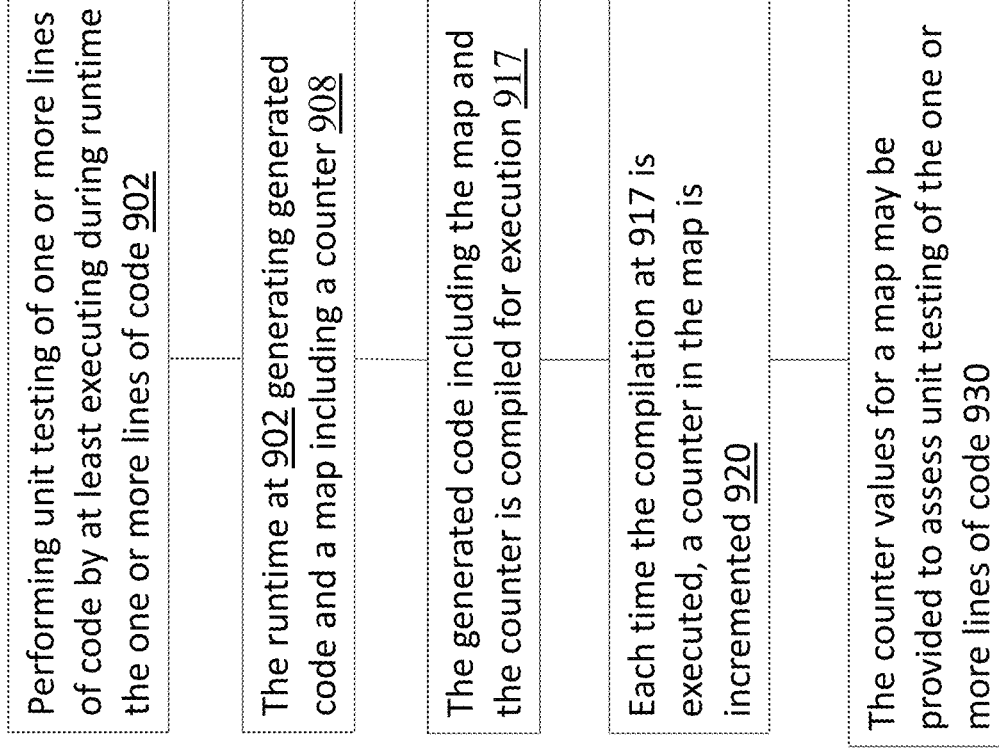
FIG. 9 depicts a flowchart illustrating a process for unit test of generated code.

In some embodiments, the pre-compiled code corresponds to C++ code, for example, which can be tested along with its generated code as noted with respect to FIG. 4 and FIG. 9.

The query plan compiler 116 may generate a query plan by at least translating the query plan into corresponding code. For instance, the query plan compiler 116 may combine the existing code for the pre-compiled query operations 125 with the dynamically generated code for the code-generating query operations 127. Moreover, because the pre-compiled query operations 125 and the code-generating query operations 127 may operate on and output different units of data, the query plan compiler 116 may insert, as noted, adaptor code (also referred to as glue code) between the code corresponding to the pre-compiled query operations 125 and the code corresponding to the code-generating operations 127.

The query plan compiler 116 may generate a query plan that includes both full table query operations and split table query operations. A full table query operation may operate on tables as a whole because performing the operation may include simultaneously loading, examining and/or altering all of the data in the table. For example, sorting the rows of a table (e.g., a SQL ORDER BY command) and hash joining two or more tables are full table query operations that may be performed on tables as a whole. By contrast, a split table query operation may operate on portions of a table because the performing the operation may include separately loading, examining, and/or altering data from individual portions of the table. For instance, filtering, materialization (e.g., projection), and equipartitioned joins (e.g., between two table partitions) may be split table query operations that can be performed on individual portions of a table and not on the table as a whole. The execution engine may replace a single split table query operation in the query plan with a plurality of parallel operations that each operates on a portion (e.g., partition and/or fragment) of the table. To generate a query plan that includes both full table query operations and split table query operations, the query plan compiler 116 may insert one or more switch operations. A switch operation may be inserted between a full table query operation and a split table query operation. A full table query operation may output a data chunk corresponding to a table in its entirety while a subsequent split table query operation operates on only portions (e.g., partition and/or fragment) of the table. As such, the switch operation may be configured to distribute data from the data chunk output by the full table query operation to each of the parallel operations forming the split table query operation. The query plan compiler may be further configured to compile code in both high-level programming languages (e.g., C++) and low-level assembly language (e.g., low level virtual machine assembly language) into executable code, which may be directly executed by a computer processor and/or processing circuitry (e.g., numerical machine code and/or the like).

The database execution engine 150 may further include a plan generator 118 configured to provide, to the query execution engine 112, the query plan subsequent to compilation by the plan compiler 116.

The query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, a query plan that has been generated and/or optimized by the query optimizer 110 and compiled by the plan compiler 116. It should be appreciated that the query execution engine 112 may also receive query plans and/or queries directly from a higher-level application or another device, such as user equipment 102A-N. The query execution engine 112 may then forward, via an execution interface 112B, the query plan to a plan execution engine 120. The plan execution engine 120 may step through the query plan and determine to perform some of the query operations from the query plan within the database execution engine 150 and delegate other query operations for execution at one or more of the database layers 190A-N. Query operations delegated to the database layers 190A-N may be sent, to one or more of the database layers 190A-N, via an execution engine application programming interface (API). To illustrate further, Table 2 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operation at Table 2 would result in a call for a dictionary look up for a value "X," an indexvector scan with a valueid obtained from the dictionary look up, which results in a document ID list. Then for each document ID, a call is made to look up the value IDs for columns A and B. The value IDs may be used to look up dictionary values to materialize the columns A and B including the actual data values for those columns.

TABLE 2

| Operation | Calls made on Database API |
| --- | --- |
| 1) TableScan (Filter X = 1) | dictionary lookup column X for the value ID of "1" indexvector scan with a valueid from the lookup, which results in a document ID (docid) list that identifies one or more rows in the table |
| 2) Materialization (Columns A, B) | For each docid, lookup value IDs (valueids) for columns A + B For the valueids, lookup dictionary value in dictionaries of A and B |

The query execution engine 150 may perform other operations including rule-based operations, such as joins and projections, as well as filtering, group by, multidimensional analysis, and/or the like to reduce the processing burden on the database layer. In this way, the query execution engine 150 may perform these and other complex operations as part of a query plan, while the database's persistence/storage layer 190A-N can perform simpler operations to reduce the processing burden at the database's persistence/storage layer 190A-N.

The query execution engine 150 may provide for a plan execution framework that is able to handle data chunk(s), pipelining, and state management during query execution. Furthermore, the query execution engine 150 may provide the ability to access table storage via an abstract interface to a table adapter, which may reduce dependencies on specific types of storage/persistence layers (which may enable use with different types of storage/persistence layers).

Figure 8:
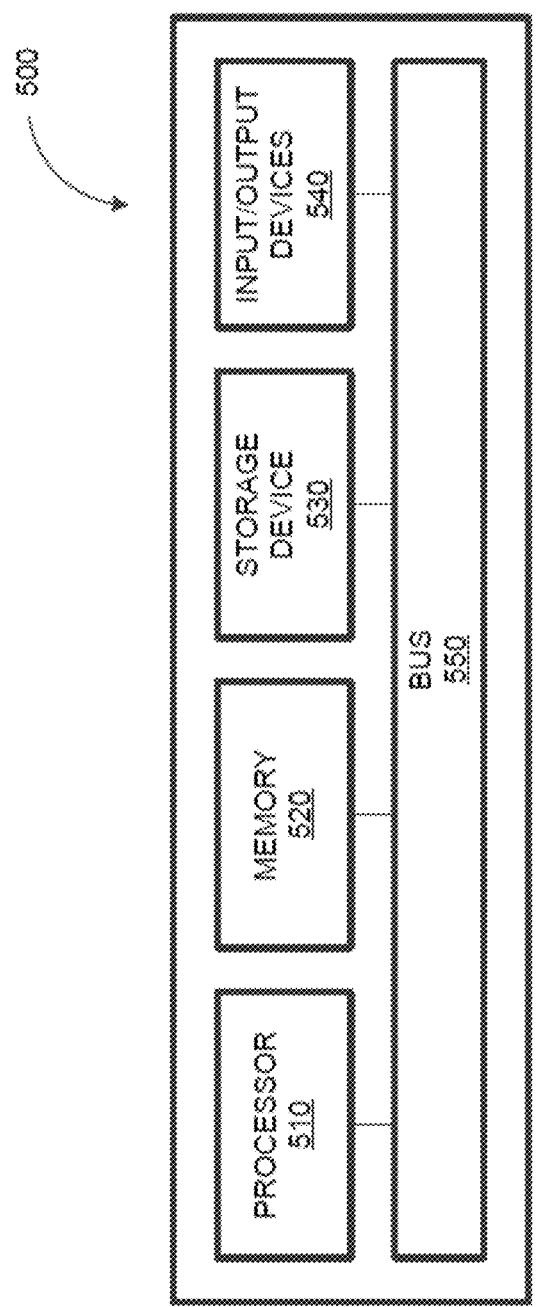
FIG. 8 depicts a block diagram illustrating a computing system.

FIG. 8 depicts a block diagram illustrating a computing system 500 consistent with implementations of the current subject matter. Referring to FIGS. 7 and 8, the computing system 500 can be used to implement the execution engine 150 and/or any components therein.

As shown in FIG. 8, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the execution engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

FIG. 9 depicts a flowchart illustrating a process for unit testing generated code.

At 902, unit testing 1115 may performing unit testing of one or more lines of code of application 1112 by at least executing during runtime the one or more lines of code. For example, unit testing may include a runtime environment including debug functionality to test application 1112 C++ code, such as 202, 302, and 310.

At 908, the runtime testing of the application's 1112 C++ code may generate additional code, such as generated code and a map including a counter. For example, the runtime testing (at 422, for example) of the C++ code may generate generated code, which may be un-compiled L code such as 598 (although other types of code may be generated). Moreover, this runtime testing may generate code for a map including a counter 599. The map may include a trace of the C++ call sequence that leads to the generated code (e.g., the call sequence 590A-E that leads to the generated code at 590F). In some implementations, the C++ code noted above may include code that also generates the code for the map and counters.

At 906, the generated code including the map and counter are compiled for execution. During compilation 426, the code for the generated code, map, and counter is compiled into executable code (e.g., low level machine language) and then executed at 428.

Each time the compiled generated code is executed during runtime (428), the counter in the map is incremented at 920. If the counter is zero (e.g., never been incremented), the corresponding generated code has not been executed or has not been executed successfully, so this may indicate that the corresponding generated code has not been covered by unit testing. If the counter is one or more, the corresponding generated code has been executed or has been executed successfully, so this may indicate that the corresponding generated code has been covered by unit testing.

At 930, the counter values may be made available to unit testing 1115. For example, unit testing may track the C++ code, such as 202, and track the corresponding generated code 204 and its map (including counter(s)). In this way, unit testing can scan the counters to see if the generated code has been covered by unit testing.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system comprising:
   at least one data processor; and
   at least one memory storing instructions which, when executed by the at least one data processor, result in operations comprising:
   performing unit testing of one or more lines of code of an application by at least:
   executing during runtime the one or more lines of code,
   generating, from the executed one or more lines of code, additional code including generated code including instructions to increment at least one counter in a map, the map mapping one or more frames to the at least one counter,
   compiling the generated code,
   incrementing, each time the compiled generated code is executed during runtime, the at least one counter in the map, and
   providing the at least one counter to enable verification of the unit testing of the generated code.

2. The system of claim 1, wherein the generating further comprises:
   inserting, into the generated code, instructions for the at least one counter; and
   compiling the generated code and the at least one counter.

3. The system of claim 1 further comprising:
   determining, from the one or more lines of code, a stack trace of calls leading to the generated code.

4. The system of claim 3, wherein the map includes a counter value for each of the calls in the stack trace.

5. The system of claim 4, wherein each time the compiled generated code is executed during runtime, the corresponding counters for each of the calls in the stack trace is incremented.

6. The system of claim 1 further comprising:
   determining, from the one or more lines of code, a plurality of stack traces of calls leading to the generated code, wherein for each of the plural of stack traces, the map includes a counter value for each of the calls in the stack trace.

7. The system of claim 1, wherein the one or more lines of code are in accordance with a first language, and wherein the generated code is in accordance with a second language.

8. The system of claim 7, wherein the first language is C++, and the second language is L.

9. A method comprising:
   performing unit testing of one or more lines of code of an application by at least:
   executing during runtime the one or more lines of code,
   generating, from the executed one or more lines of code, additional code including generated code including instructions to increment at least one counter in a map, the map mapping one or more frames to the at least one counter,
   compiling the generated code,
   incrementing, each time the compiled generated code is executed during runtime, the at least one counter in the map, and
   providing the at least one counter to enable verification of the unit testing of the generated code.

10. The method of claim 9, wherein the generating further comprises:
    inserting, into the generated code, instructions for the at least one counter; and
    compiling the generated code and the at least one counter.

11. The method of claim 9 further comprising:
    determining, from the one or more lines of code, a stack trace of calls leading to the generated code.

12. The method of claim 11, wherein the map includes a counter value for each of the calls in the stack trace.

13. The method of claim 12, wherein each time the compiled generated code is executed during runtime, the corresponding counters for each of the calls in the stack trace is incremented.

14. The method of claim 9 further comprising:
    determining, from the one or more lines of code, a plurality of stack traces of calls leading to the generated code, wherein for each of the plural of stack traces, the map includes a counter value for each of the calls in the stack trace.

15. The method of claim 9, wherein the one or more lines of code are in accordance with a first language, and wherein the generated code is in accordance with a second language.

16. The method of claim 15, wherein the first language is C++, and the second language is L.

17. A non-transitory computer-readable storage medium including program code which when executed causes operations comprising:
 performing unit testing of one or more lines of code of an application by at least:
  executing during runtime the one or more lines of code,
  generating, from the executed one or more lines of code, additional code including generated code including instructions to increment at least one counter in a map, the map mapping one or more frames to the at least one counter,
  compiling the generated code,
  incrementing, each time the compiled generated code is executed during runtime, the at least one counter in the map, and
  providing the at least one counter to enable verification of the unit testing of the generated code.

18. The non-transitory computer-readable storage medium of claim 17, wherein the generating further comprises:
 inserting, into the generated code, instructions for the at least one counter; and
 compiling the generated code and the at least one counter.

19. The non-transitory computer-readable storage medium of claim 17 further comprising:
 determining, from the one or more lines of code, a stack trace of calls leading to the generated code.

20. The non-transitory computer-readable storage medium of claim 19, wherein the map includes a counter value for each of the calls in the stack trace.

* * * * *